US005122269A

United States Patent [19]

De Reuver

[11] Patent Number: 5,122,269

[45] Date of Patent: Jun. 16, 1992

[54] MAGNETIC FILTER

[75] Inventor: Johannes L. De Reuver, Nijmegen, Netherlands

[73] Assignee: Smit Transformatoren B.V., Nijmegen, Netherlands

[21] Appl. No.: 615,607

[22] Filed: Nov. 19, 1990

[30] Foreign Application Priority Data

Nov. 21, 1989 [NL] Netherlands ........................ 8902878

[51] Int. Cl.[5] ........................ B01D 35/06

[52] U.S. Cl. ........................ 210/222; 209/223.1; 209/224; 209/228

[58] Field of Search ........................ 210/222, 695, 232; 209/224, 232, 223.1, 228

[56] References Cited

U.S. PATENT DOCUMENTS 2,094,616 10/1937 Parker ........................ 209/232
3,143,496 8/1964 Maretzo ........................ 210/222

FOREIGN PATENT DOCUMENTS

EP345853 12/1989 European Pat. Off. ............ 210/222
58797 6/1890 Fed. Rep. of Germany ...... 210/695
62-74460 4/1987 Japan .
63-4818 1/1988 Japan .
63-4819 1/1988 Japan .
925394 1/1979 U.S.S.R. .

*Primary Examiner*—W. Gary Jones
*Assistant Examiner*—Matthew O. Savage
*Attorney, Agent, or Firm*—Wells, St. John & Roberts

[57] ABSTRACT

A bar filter is disclosed which is fit for use in an apparatus for removing phosphates from waste water. Thereto phosphates are chemically bound to magnetic material, like magnetite, and subsequently the liquid containing the suspended particles is fed through a filter according to the present invention. The magnetic particles adhere to the bars of the magnetic filter so that the filter gradually fills with the particles. According to the present invention, the configuration of the bars of the filter is such that the gradient of the magnetic field is substantially constant, leading to an even filling of the filter, so that the frequency of flushing the filter to empty it is limited as far as possible. Preferably the density of the bars is a plane perpendicular to the bars is constant.

18 Claims, 5 Drawing Sheets

MAGNETIC FILTER

TECHNICAL FIELD

The present invention relates to a filter for filtering magnetic particles from a flowing liquid, the filter comprising a chamber, through which the liquid to be filtered is fed; bars provided parallel to the direction of flowing of the liquid in the chamber; and means for applying a magnetic field perpendicular to the bars.

BACKGROUND OF THE INVENTION

Bar filters are applied in apparatuses, in which a liquid, in which magnetic particles have been suspended is filtered for removing the magnetic particles from the liquid.

Such an apparatus is used for removing phosphates from waste water. Therefore, phosphates are chemically bonded to magnetic material, for instance magnetite, after which the liquid thus obtained is fed through a magnetic filter. Therein the phosphate-magnetite particles adhere to the bars of the magnetic filter, in which the filter is increasingly filled with these particles, which have to be removed from the liquid. At a certain moment the filter is filled to such extent, that the passage thereof is limited considerably. Then the filter has to be cleaned.

Whereas such cleaning actions interrupt the real action of the filter, it is necessary to limit the frequency thereof as far as possible. This frequency can be limited by flushing only when a filling to the highest extent, i.e. as homogeneous as possible, is obtained.

The aim of the present invention is to provide such a filter, in which the filling of the filter is as much homogeneous as possible.

This aim is reached, in that the distance between the bars in the direction of the field lines is such, that the gradient of the magnetic field is constant.

As a consequence of this dimensioning, leading to a constant gradient of the magnetic field, the magnetic particles and the liquid, which are filtered from the flowing liquid by means of the magnetic filter, a force which is as constant as possible, so that the chance, that they are drawn to one of both adjacent bars as an equal magnitude at all locations within the filter. This leads to an even filling of the filter.

According to a preferred embodiment the density of the bars in a plane perpendicular to the bars is constant. Also this feature leads to an improvement of the evenness of the filling of the filter, as the space between the bars is mutually constant, so that the space to be filled by the magnetic particles is equal.

Subsequently the present invention will be elucidated with the help of the accompanying drawings.

BRIEF DESCRIPTION OF THE DRAWINGS

The preferred embodiments of the invention are illustrated in the accompanying drawings, in which.

DETAILED DESCRIPTION OF THE PREFERRED EMBODIMENTS

The following disclosure of the invention is submitted in furtherance with the constitutional purpose of the Patent Laws "to promote the progress of science and useful arts" (Article 1, Section 8).

Figure 1:
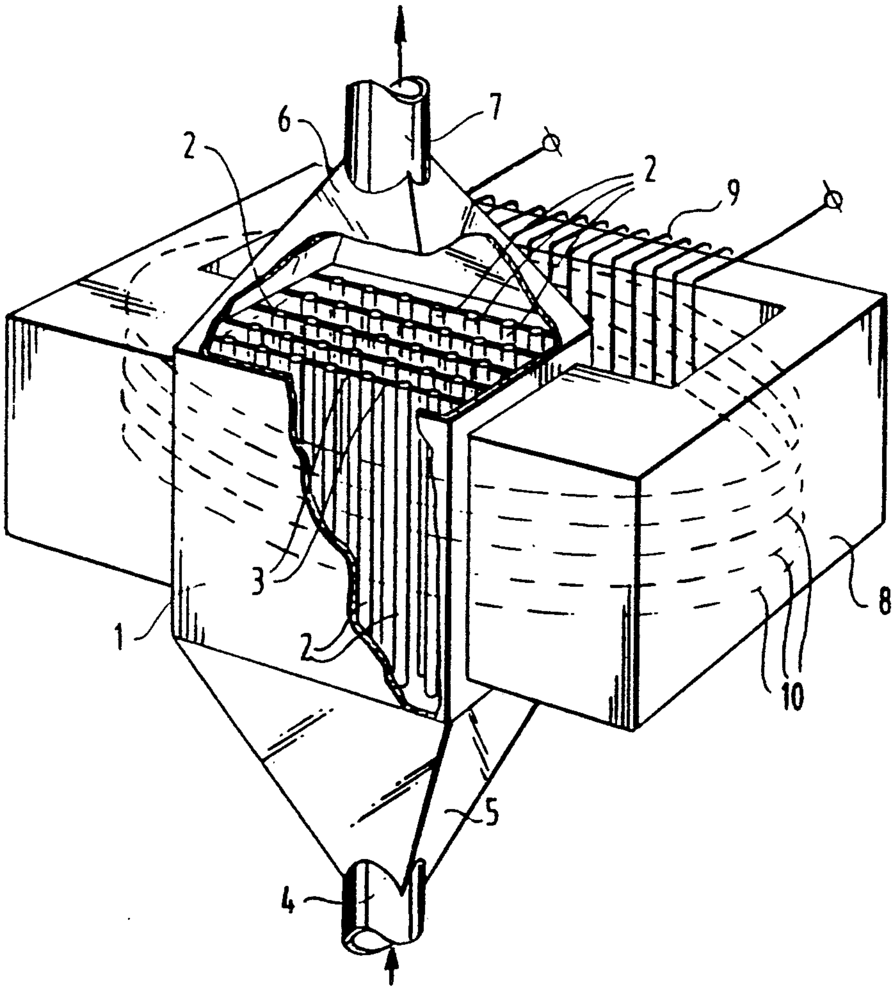
FIG. 1 is a perspective view, partially broken away of a first embodiment of an apparatus according to the present invention.

The apparatus depicted in FIG. 1 comprises a chamber 1, in which a number of magnetic bars 2 extending in a vertical direction has been provided. These bars are mutually connected in a group at their upper and lower sides respectively by means of rods or strips 3 of non-magnetic material. The distance between adjacent bars within the group in the direction of the field lines is constant, so that the gradient of the magnetic field is equal. Also the distance between adjacent bars in the direction perpendicular to the field direction is equal, so that the room to be filled is equal. Further, a supply pipe 4 has been provided, which is connected with the chamber 1 by means of a widening coupling piece 5. Above the chamber 1 a second coupling piece 6 has been provided, leading to a drain pipe 7.

Further, a magnetic circuit connected with two opposite sides of the chamber 1 has been provided, which circuit comprises a yoke 8 of magnetic material, around which a winding 9 has been wound.

During the action of this apparatus, a liquid with magnetic particles suspended therein is supplied from below through the supply line 4, after which the liquid is fed to the chamber 1 by means of the coupling piece 5, and is drained via the coupling piece 6 and the drain pipe 7. Further, a current is applied to the winding 9, so that a magnetic field 10 will develop in the yoke 8. The direction of the magnetic field is indicated by dotted lines 10. The field will also extend through the chamber 1, and therein it will be guided substantially through the bars 2, such that the field extends in a bead-like way between two subsequent bars. Herein also the equal distance between the bars (which are preferably cylindrical), coinciding with several times the diameters of the bars is of importance. This distance is advantageously between two and five times the bar diameters. As a consequence thereof, a substantial magnetic field gradient develops in the vicinity of the bars, so that the magnetic particles suspended in the liquid will be attracted. These particles will adhere to the bars, so that the greater part of the magnetic particles will be removed from the liquid. As the distance between the bars is equally great, and the gradient of the field is just as great, the growing of the particles in all areas will be equal, so that the filter will be filled evenly.

After some time, the accumulation of the magnetic particles around the bars will have reached such a level that the passage of the liquid has become too small. Then the flowing of the liquid is stopped, the current through the winding 9 is switched off, whereas from the opposite direction liquid is supplied under a substantial pressure, flushing away the magnetic particles grown on to the bars. As a consequence of the fact, that on each of the bars 2 a non-magnetic layer has been provided, the particles grown on are not attracted so strongly by remanent magnetism that the flushing away is difficult. On the contrary, the adhered particles can be removed easily.

Figure 2:
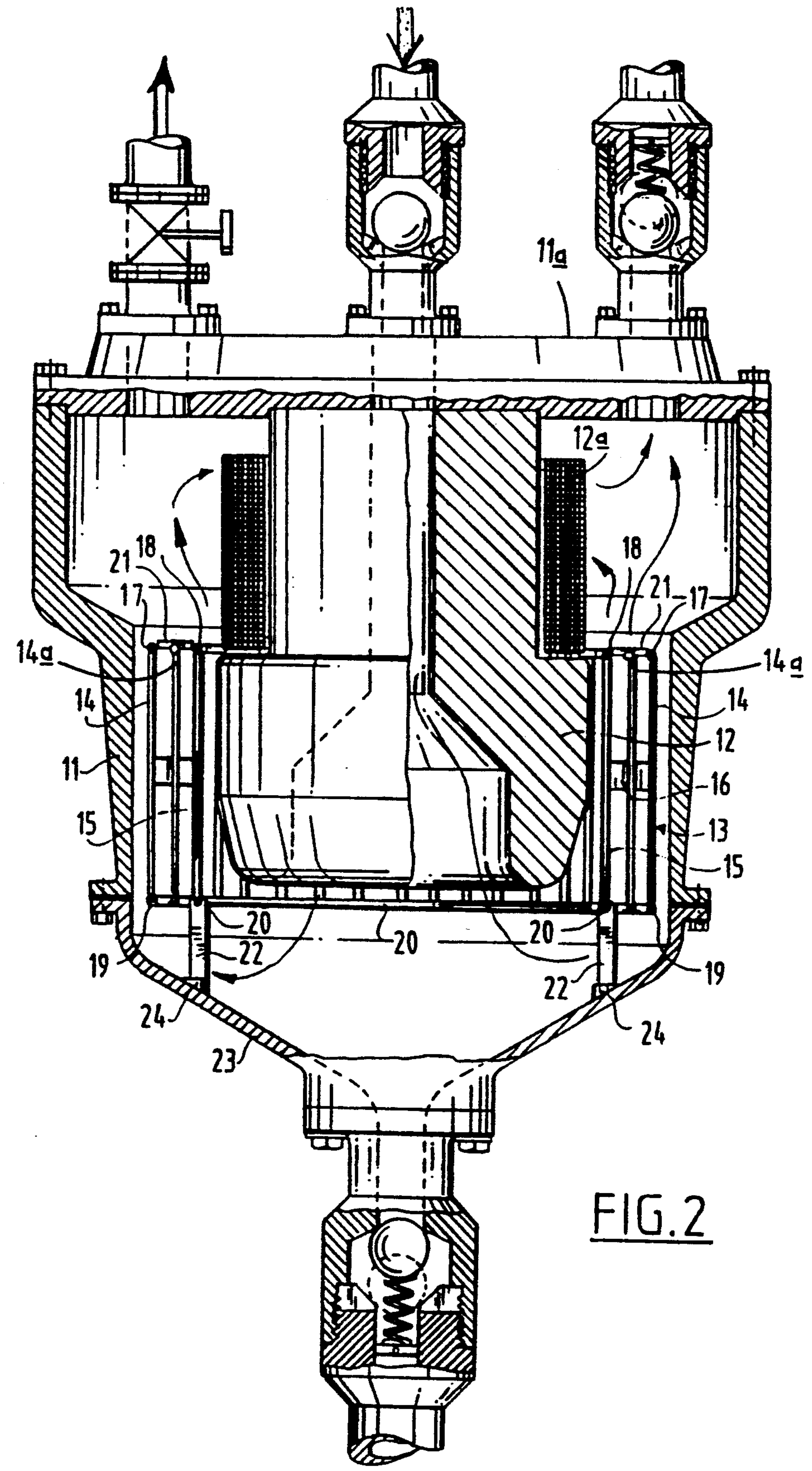
FIG. 2 is a side view, partially executed as a cross section of a second embodiment of the present invention, in which this is applied in an apparatus for generating a magnetic field.

Further, FIG. 2 shows another embodiment of the filter according to the present invention. The filter of this embodiment is received within a vessel, in which a magnetic core 12 has been provided thereby forming an internal chamber in the form of a cylindrical jacket. The vessel is at its top closed by a top 11*a*, and thus the vessel wall 11, the top 11*a* and the core 12 form a magnetic circuit. For excitation of the magnetic circuit, a coil 12*a* has been provided. When a current flows through the cylindrical coil 12*a*, the magnetic circuit is excited, so that there is a magnetic field crossing radially the annular gap between the core 12 and the vessel wall 11.

In the case of the present embodiment, the bar filter has been provided in the space between the vessel wall 11 of the apparatus and the core 12. The bar filter 13 comprises a grouping formed by three arrays of bars 14, 14*a*, 15, each array in the shape of a circle, which has been mutually connected in the radial direction between rods 16 of non-magnetic material. The magnetic bars of the filter are parallel to the central axis of the cylindrical jacket.

In order to assure a constant gradient of magnetic field within the area occupied by the bars in the radial magnetic field direction, the distance between the bars 14*a* belonging to the middle circle and the bars 14 belonging to the outer circle is smaller than the distance between the bars 14*a* of the middle circle and the bars 15 of the inner circle. More specifically, these distances have been chosen such, that the product of the distance between two bars adjacent in the radial direction and the mean distance between these bars and the center axis is constant. Further, in an outer direction, the distance between the bars in the tangential direction increases so that the density of the bars is maintained constant in a plane perpendicular to the bars.

At their upper sides the arrays of bars are welded to concentric hoops 17, 18 respectively and at their lower sides to hoops 19, 20 respectively. The hoops do not have to be made of non-magnetic material. Further, the hoops are mutually connected by means of nonmagnetic rods or strips 21. The hoops 17, 18, 19, 20 can be interrupted to divide the filter into segments, so that the segments can be removed piece by piece from the magnetic housing, just as is the case in the embodiment according to FIG. 5 still to be described.

At their lower sides, the inner hoops 20 comprise a support 22, through which the whole filter rests against support 24 provided at the inner side of the lower piece 23.

Figure 3:
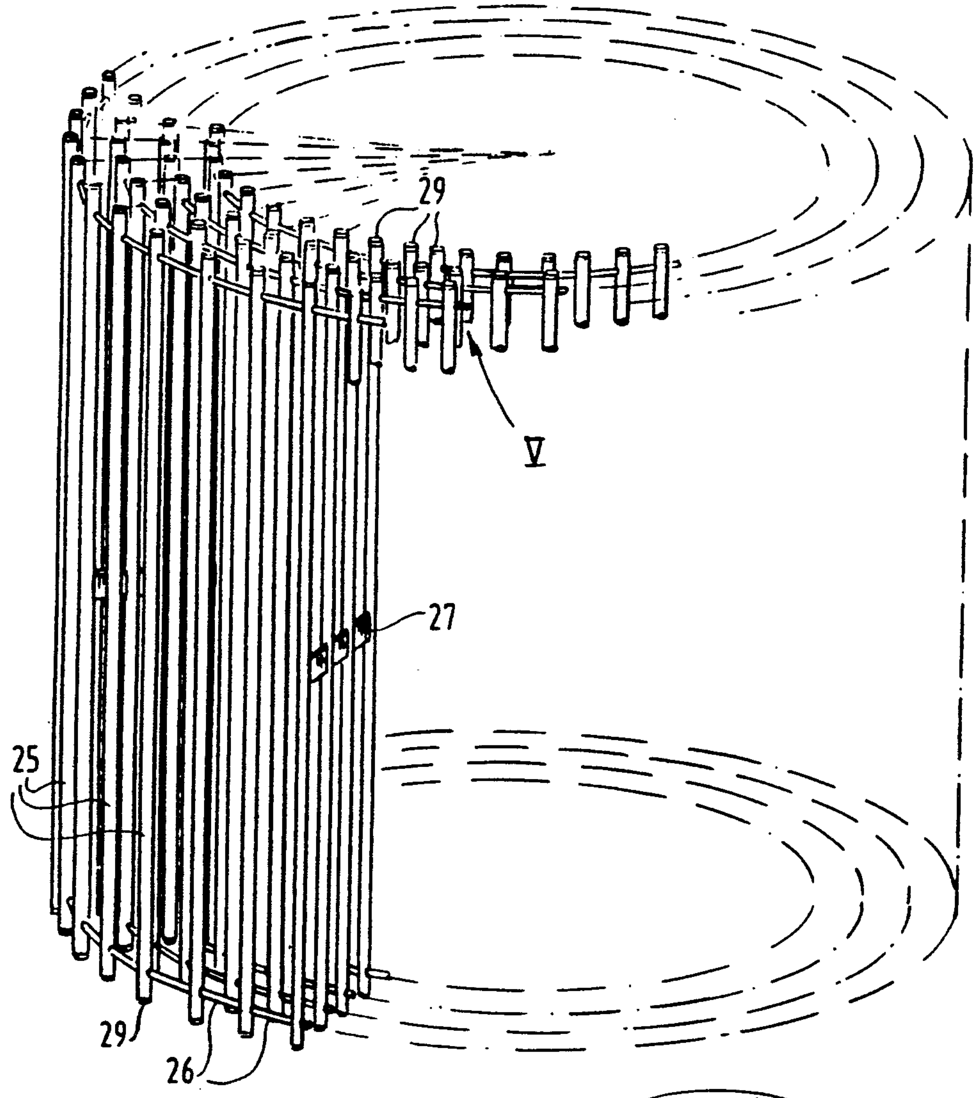
FIG. 3 is a schematic perspective representation of a third embodiment of the present invention.

FIG. 3 shows another embodiment of the annular filter, which diverges from the embodiment shown in FIG. 2 only by the number of bars held together in the group; in the embodiment according to FIG. 3, the group of bars arranged according to four circles have been provided, whereas in the embodiment according to FIG. 2, the group includes only three circles of bars. Further, in this embodiment, hollow bars or pipes 25 have been applied, which are mutually connected in the radial direction by means of solid rods 26. Also here the filter bars 25 are provided with a layer of nonmagnetic material. Halfway the bars are mutually connected in the radial direction by strips 27 of non-magnetic material. This filter can be applied in the same way as the filter as depicted in FIG. 2.

Figure 4:
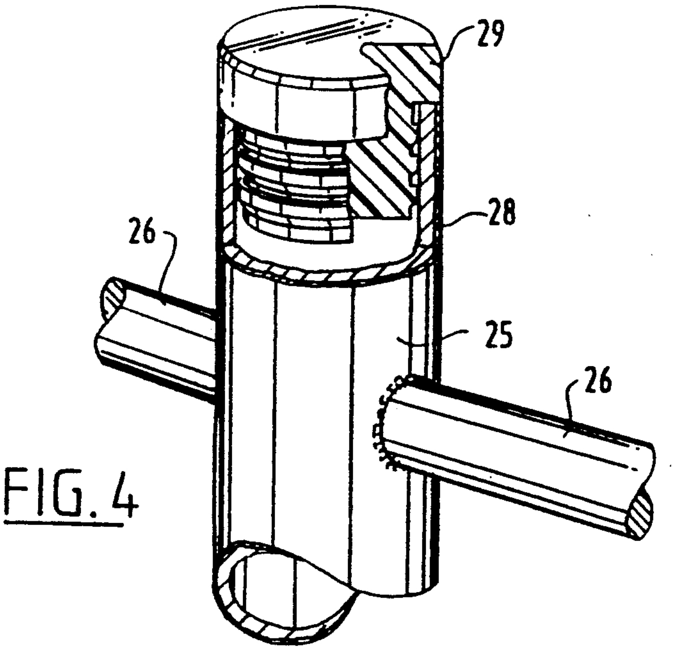
FIG. 4 is a perspective view partially broken away of a detail of the embodiment shown in FIG. 3.

As is shown in FIG. 4, every pipe 25 is surrounded by a layer 28 of non-magnetic material. The non-magnetic material in all embodiments described is advantageously an epoxy resin. Alternatively, the non-magnetic material may be a metal such as zinc, which does not exhibit magnetic properties. This provides the action as set out in the preamble of the present application. At the upper side, just as at the lower side of every pipe 25, caps 29 have been provided to avoid the liquid entering the inner place of the pipes.

Figure 5:
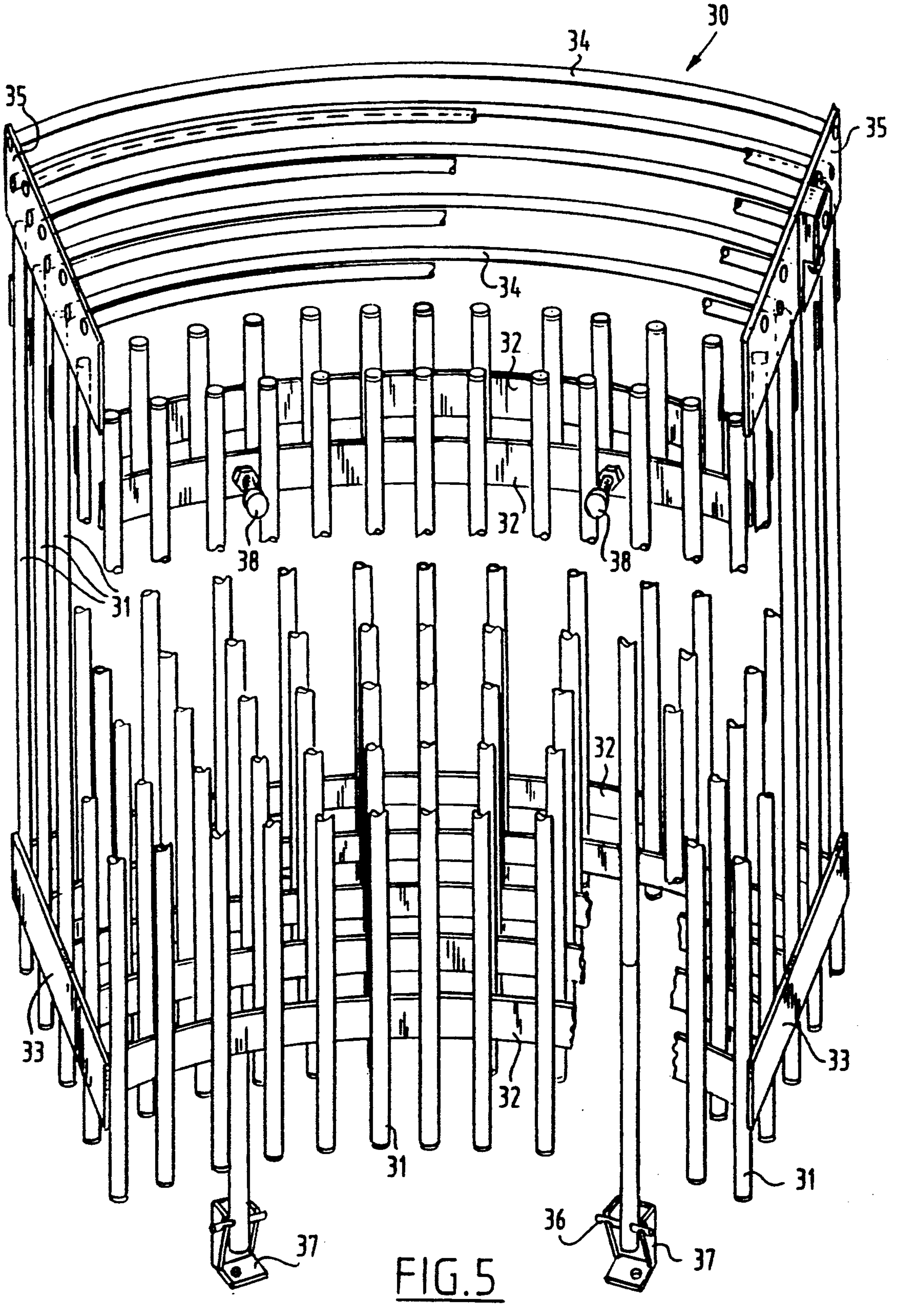
FIG. 5 is a schematic perspective view of a segment of a fourth embodiment of the present invention.
Figure 6:
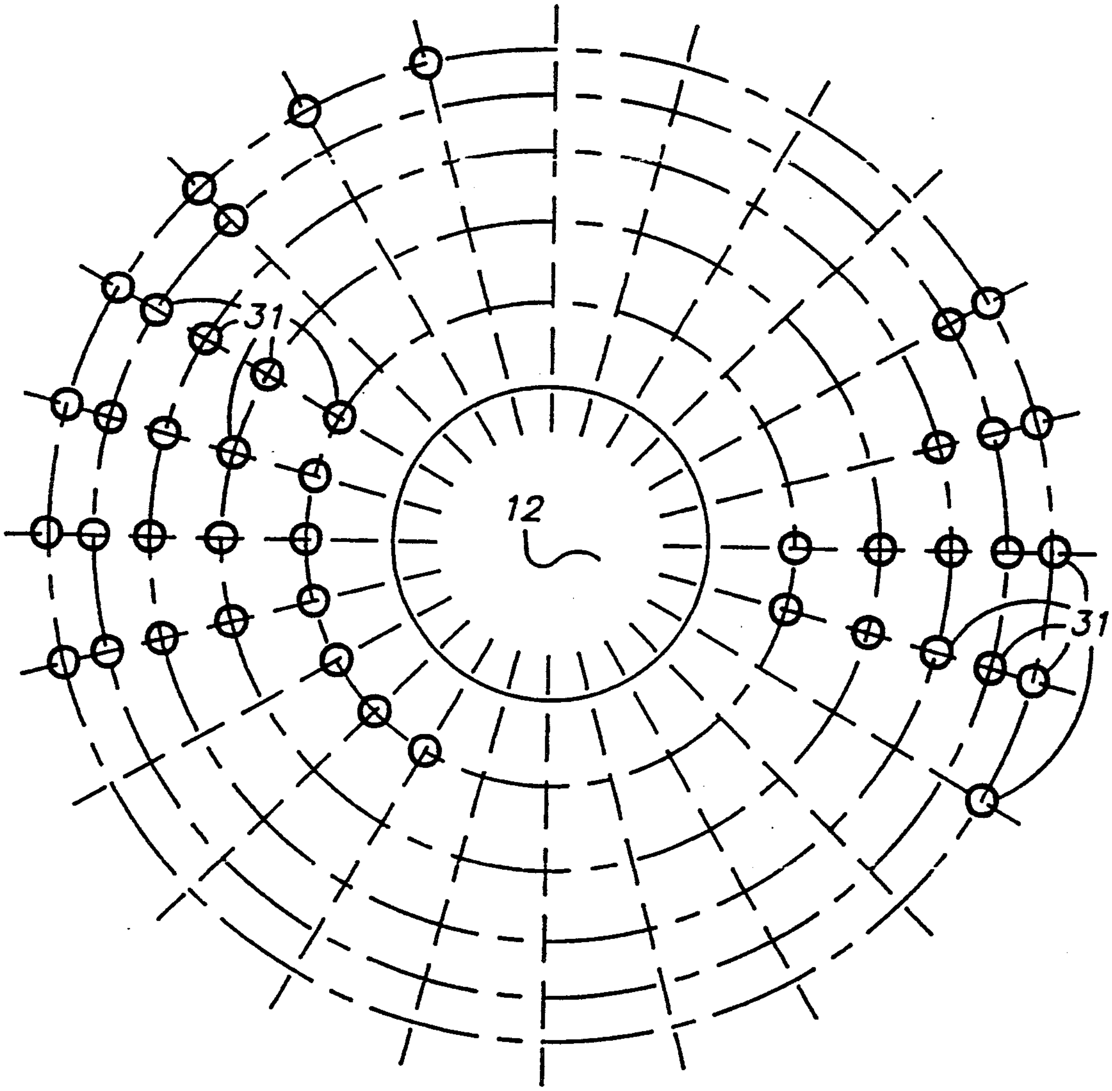
FIG. 6 is an end view of the magnetic bar arrangement shown in FIG. 2.

FIG. 5 shows an embodiment, which can be applied to the apparatus shown in FIG. 2, and which the bar filter has been divided into segments 30 to ease the removal from the filter, for instance for inspection. FIG. 5 shows such a segment 30.

The segment 30 is composed of five groups or arrays of bars 21, in which each array has been arranged like a circle segment. Every array of bars is kept by two rods or strips 32. The bars have been welded to the strips. Further the ends of the strips are connected by rods or strips 33 of non-magnetic material extending radially. For every segment 30, two sets of five tangential strips 32 have been provided, of which the strips belonging to the lower set are connected with the strips 33. Consequently in such a segment $5\times12=60$ bars are fixed.

The distances between the bars and the radial direction are such, that the product of the mean radial distance between two bars and the center and the distance between these two adjacent bars is constant. Further the distances between the bars in the tangential direction within an array are constant, whereas the distances between bars per array increase as the total number of bars in every circle is equal and the circumference of the circle is increasing.

FIG. 5 also exemplifies a segment of a second filter, located behind the main filter described thus far.

At last, a set of bended bars 34 extending in a tangential direction have been provided, which have been connected at their ends by plates 35. Both plates 35 are connected with the outer bars 31.

The bars 34 have been provided in two layers, of which the lower layer is located between the imaginary extension of the bars 31. The remaining layer is axially aligned with others of the bars 31 as shown in FIG. 5.

This provides an improved catching of magnetic particles obtained by the particles which move in the direction of flow in the middle between two bars 31 by means of the lower bar 34. The upper layer of bars serves as a last possibility for the particles which have not used the first catching possibilities. Thus, rate of catching of the complete filter is substantially improved.

For fixing the filter segment 30 in the chamber between the wall 11 and the core 12, two of the outer arrays of bars 31 have been extended downwardly, and at a lower side has been provided with a cross piece 36, making the segment rest on a support 37. At last two stops 38 have been provided on the outer strip 32 for fixing the segment 30. This also eases the fixing of the filter segment. During exciting the magnet, the filter segment will be pulled towards the magnet so that a good fixation is obtained.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A filter for filtering magnetic particles from a liquid flowing in a prescribed direction through the filter, the filter comprising:

a vessel for receiving the liquid passing in the prescribed direction therethrough;

a magnetic core in the vessel forming a cylindrical jacket on an axis between the vessel and the core, through which the liquid to be filtered is fed, the axis being parallel to the prescribed direction of liquid flow;

a plurality of magnetic bars mounted within the jacket, spaced apart from one another and parallel to the axis and the direction of flow of liquid;

means for applying a magnetic field generated radially with respect to the axis and perpendicular to the bars; and wherein the product of the distance between two bars subsequent in radial direction and the mean radial distance between said bars and the axis of the cylindrical jacket is constant.

2. A filter according to claim 1, wherein the bars are provided in segments, connected together by non-magnetic rods, said segments being removable independently from the jacket.

3. A filter according to claim 1, wherein the bars include layers of non-magnetic material.

4. A filter according to claim 3, wherein the layers of non-magnetic material are comprised of an epoxy resin.

5. A filter according to claim 4, wherein the bars are cylindrical and wherein the distance between the bars is equal to several times the diameter of the bars.

6. A filter according to claim 5, wherein the distance between the bars is between two and five times the diameter of the bars.

7. A filter according to claim 3, wherein the layers of non-magnetic material are comprised of zinc.

8. A filter according to claim 7, wherein the bars are cylindrical and the distance between the bars is equal to several times the diameter of the bars.

9. A filter according to claim 8, wherein the distance between the bars is between two and five times the diameter of the bars.

10. A filter according to claim 3, wherein the bars are cylindrical and wherein the distance between the bars is equal to several times the diameter of the bars.

11. A filter according to claim 10, wherein the distance between the bars is between two and five times the diameter of the bars.

12. A filter according to claim 1, wherein the bars are hollow.

13. A filter according to one of the claim 12, wherein the bars include layers of non-magnetic material.

14. A filter according to claim 13, wherein the layer of non-magnetic material is an epoxy resin.

15. A filter according to claim 13, wherein the layer of non-magnetic material is zinc.

16. A filter according to claim 1, further comprising a set of magnetic bars downstream of said plurality of magnetic bars, said set being oriented perpendicular to the direction of liquid flow and to the direction of the magnetic field.

17. A filter according to claim 16, wherein at least a part of the bars of the second filter are situated radially between projections of the bars that are parallel to the fluid flow.

18. A filter according to claim 17, wherein at least a part of the bars of the second filter are axially aligned with at least part of the bars that are parallel to the fluid flow.

* * * * *